United States Patent
Weiler

(10) Patent No.: US 8,557,071 B2
(45) Date of Patent: Oct. 15, 2013

(54) ULTRASOUND WELDING DEVICE AND METHOD FOR WELDING MATERIAL WEBS

(75) Inventor: Klaus Weiler, Karlsruhe (DE)

(73) Assignee: Herrmann Ultraschalltechnik GmbH & Co. KG (DE)

( * ) Notice: Subject to any disclaimer, the term of this patent is extended or adjusted under 35 U.S.C. 154(b) by 0 days.

(21) Appl. No.: 13/266,307

(22) PCT Filed: Apr. 26, 2010

(86) PCT No.: PCT/EP2010/055563
§ 371 (c)(1),
(2), (4) Date: Dec. 29, 2011

(87) PCT Pub. No.: WO2010/125030
PCT Pub. Date: Nov. 4, 2010

(65) Prior Publication Data
US 2012/0118476 A1     May 17, 2012

(30) Foreign Application Priority Data
Apr. 27, 2009    (DE) .......................... 10 2009 002 675

(51) Int. Cl.
*B32B 37/00*     (2006.01)

(52) U.S. Cl.
USPC ...................................... 156/73.1; 156/580.1

(58) Field of Classification Search
USPC ........... 156/73.1, 580.1, 580.2; 264/442, 443, 264/444, 445; 425/174.2; 220/1.1, 110.1; 310/323.01, 323.18; 228/1.1, 110.1
See application file for complete search history.

(56) References Cited

U.S. PATENT DOCUMENTS

| | | | |
|---|---|---|---|
| 5,519,983 A | 5/1996 | Moen | |
| 2007/0017623 A1* | 1/2007 | Wild et al. | ................... 156/73.1 |
| 2008/0173694 A1 | 7/2008 | Wild et al. | |
| 2009/0250171 A1 | 10/2009 | Wieduwilt et al. | |

FOREIGN PATENT DOCUMENTS

| | | |
|---|---|---|
| CH | 489350 | 6/1969 |
| DE | 1296357 | 5/1969 |
| DE | 2812138 A1 | 9/1979 |
| DE | 10331064 A1 | 2/2005 |
| DE | 10356431 A1 | 6/2005 |
| DE | 60203614 T2 | 9/2005 |
| DE | 102006009890 A1 | 9/2007 |
| DE | 102006020429 A1 | 10/2007 |
| EP | 1745916 A1 | 1/2007 |
| EP | 1854618 A1 | 11/2007 |
| WO | 2007012917 A1 | 2/2007 |
| WO | 2008059352 A1 | 5/2008 |

* cited by examiner

*Primary Examiner* — James Sells
(74) *Attorney, Agent, or Firm* — Paul & Paul

(57) ABSTRACT

The present invention relates to an ultrasound welding device for welding material webs, for example, films, having an anvil (1) with an anvil welding surface, and a sonotrode (2) with a sonotrode welding surface, wherein the anvil is movable relative to the sonotrode. In order to provide an ultrasound welding device that reacts promptly to changes in material thickness and properties of the material to be welded, the invention proposes to provide a counterforce generator, which exerts a counterforce on the anvil in the direction of the sonotrode, if the anvil is moved out of a reference position away from the sonotrode.

15 Claims, 5 Drawing Sheets

ULTRASOUND WELDING DEVICE AND METHOD FOR WELDING MATERIAL WEBS

Figure 1:
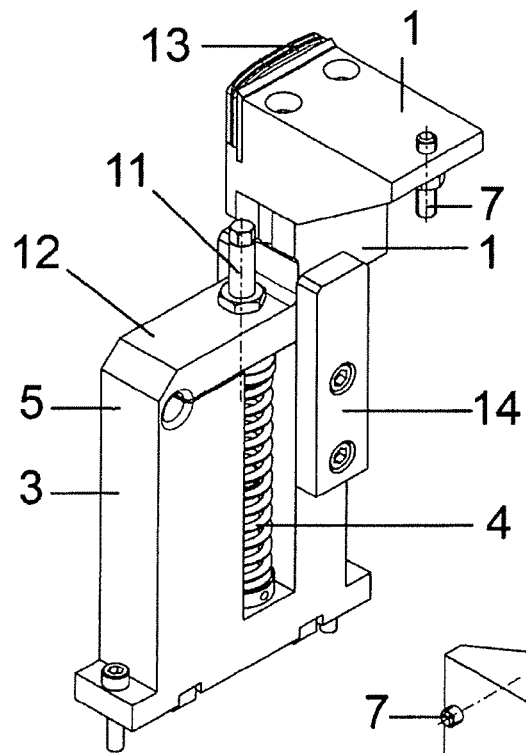

The invention concerns an ultrasound welding device with which plastic material webs can be ultrasound-welded. Such an ultrasound welding device includes an ultrasound generator, a sonotrode and an anvil. Generally the anvil is movable relative to the sonotrode so that material webs such as for example film webs can be easily brought into position between the sonotrode and the anvil which then apply the ultrasound oscillations to the material webs, superimposed with a welding force, for the welding operation. Basically ultrasound welding in which two or more material webs are welded together is to be distinguished from ultrasound cutting in which the material webs are severed by means of ultrasound.

By way of example the specified ultrasound welding devices are used in tubular bag packaging machines for sealing the head and/or longitudinal seams.

The thickness of the respective material webs is frequently markedly below 0.1 mm. Changes in the process parameters or deviations in the material properties or the welding speed therefore have a great influence on the welding result. Mastering those parameters to ensure a welding result of constantly good quality is correspondingly more important, the thinner the films are.

In the case of thin films the welding process takes place in a spatially and functionally greatly restricted region, whereby even minor changes in the process temperature, the welding force and the position of the tools (anvil and sonotrode) relative to each other can considerably change the welding result.

Various devices and operating procedures are known in the state of the art to manage the relevant process parameters and thus the welding process.

One possible option is to keep the size of the welding gap constant. The size of the welding gap is influenced in particular by thermal expansion of the component parts involved in the process. The heat is produced by power losses in the ultrasound generator, damping losses in the oscillating parts and friction in the process itself. To keep the welding gap constant two different methods are usually employed. A first one is regulating the power output of the generator at a constant value. That provides that the input of heat into the system is also constant, whereby constant process conditions occur after a settling-in time. A further possible option is to directly detect the spacing of the anvil relative to the sonotrode and regulate it at a constant value.

In that respect inter alia a piezoelectric actuating member is used to set the welding gap.

A further possible way of achieving constant process conditions is represented by keeping the welding force constant. A possible way of implementing this is to detect the welding force and to regulate the force at a constant value by way of suitable actuating members.

What is common to those solutions is that they use regulating systems which require costly measurement technology, complicated and precise actuating members and a regulating system which is complicated and expensive to design, including regulating electronics. The regulating circuits produced in that way admittedly make it possible to control the process but they have an adverse influence on operability, availability and complexity of the ultrasound welding devices.

Films which are spliced to each other are frequently used in tubular bag packaging machines. To increase the film web length a plurality of films are secured to each other. For that purpose adjacent film webs are placed one against the other in slightly overlapping relationship and the overlap location is provided with an adhesive strip so that the two film webs are held together. That splice connection can occur within a film roll as the film manufacturer has already joined a plurality of webs together, but it can be produced manually in the roll-changing operation. When such a splice connection passes through the gap between the sonotrode and the anvil the material web thickness temporarily increases abruptly to more than double. Such abrupt changes in the material web thickness can be handled only with difficulty with the known structures.

Therefore the object of the present invention is to provide an ultrasound welding device which reacts very quickly to changes in the material thickness and the material properties of the material to be welded.

That object is attained by an ultrasound welding device for welding material webs such as for example films having an anvil with an anvil welding surface and a sonotrode having a sonotrode welding surface, in which the anvil is mounted movably relative to the sonotrode and there is provided a counterforce generator which exerts a counterforce on the anvil in the direction of the sonotrode if the anvil is moved out of a reference position away from the sonotrode.

In that way the anvil can move away from the material web if the pressure applied to the material web by the sonotrode becomes too great. If the sonotrode expands for example during the welding operation that increases the force which the sonotrode welding surface applies to the material web. If the force becomes so great that a satisfactory welding result can no longer be achieved the material web can move away from the sonotrode due to the mobility of the anvil. In that case the welding force is determined by the counterforce generator.

For example the counterforce generator can be a spring element which urges the anvil in the direction of the reference position. As an alternative thereto the counterforce generator can also have a pneumatic or hydraulic cylinder.

It is particularly advantageous if the counterforce of the counterforce generator can be adjusted. In that way the welding force can be adjusted to all material webs to be processed.

That adjustability of the counterforce makes it possible to adjust the welding force. In the case of spring elements the counterforce can be adjusted by changing the prestressing of the spring elements. That is possible by altering the length of the spring element by displacement of the support points of the spring element so that the prestressing thereof is adjusted. That displacement can be effected for example by an adjusting screw or an adjusting drive which is actuable manually or which is driven automatically, for example by an electric motor. As the counterforce generator can also be a pneumatic or hydraulic cylinder the welding force in that case can be adjusted by altering a pressure in the cylinders, that in operation is constant.

To achieve a welding result that is as good as possible, it is not only necessary to limit the welding force but it is also necessary to ensure that the welding force does not fall below a given minimum value. That can be effected for example by suitable adjustment of the counterforce. On the other hand in particular when dealing with very thin films, it is necessary to ensure that the anvil welding surface and the sonotrode welding surface do not approach each other excessively, in order to prevent the material web from being severed.

Therefore in a further preferred embodiment there is provided an abutment element which is arranged in such a way that it limits the movement of the anvil in the direction of the sonotrode so that preferably the anvil welding surface maintains a minimum spacing, which is fixed by the abutment element, relative to the sonotrode welding surface, wherein particularly preferably the minimum spacing is adjustable. The abutment element therefore prevents the anvil welding surface from moving further in the direction of the sonotrode welding surface, even if the force of the counterforce generator is further increased. That also has the advantage that the welding pressure which can be afforded with the counterforce generator can be markedly increased without the risk of severing the material web arising in operation. In addition, with that configuration, the counterforce produced by the counterforce generator can be more easily kept substantially constant.

Thus for example the counterforce generator can be so adjusted that the anvil exerts a force on the abutment element when the anvil is at the minimum spacing relative to the sonotrode, that is to say when the anvil bears against the abutment element. If the counterforce generator includes one or more spring elements then the welding force, to a certain degree, also depends on the thickness of the material web or also on the damping and elasticity of the material to be welded.

A spring joint as a guide, by virtue of its spring action, can also represent a part of the counterforce generator. To achieve suitable adjustability of the welding force the spring rates of the spring joint and a spring element as the adjustable counterforce generator must be matched to each other. That correspondingly applies in relation to hydraulic or pneumatic cylinders. The use of a long spring which is compressed by a prestressing distance and in that condition bears against an abutment can provide for achieving a welding force which is as high as by virtue of using a shorter spring with a higher spring rate, which is prestressed only by a shorter prestressing distance. The advantage of the longer spring is that fluctuations in the thickness of the material web and thus changes in the prestressing effect lead to smaller changes in force, which ultimately results in a more uniform welding process. Consequently the prestressing distance is advantageously at least double the permissible maximum deflection of the anvil. If a pneumatic or hydraulic cylinder is subjected to a constant pressure and if that represents the main proportion of the counterforce, then the welding force is substantially independent of the thickness of the material web. The spring rate of the spring and the mass of the movable assembly also influences the resonance frequency of the anvil. The harder the spring is, the correspondingly higher is the resonance frequency. The resonance frequency is advantageously markedly below the oscillation frequency of the sonotrode.

Adjustability of the abutment element can be achieved for example by a part of the abutment element being formed by a screw, for example a setscrew. It is also advantageous if the screw is in the form of a measurement screw, best with a fine thread, so that the desired setting can be easily retrieved again. That can be arranged both on the side of the sonotrode and also on the side of the anvil. The counterpart portion of the abutment element is preferably made from a wear-resistant material, for example hard metal or carbide metal, hardened steel or another material of high strength. It is important in that respect that the adjustable abutment is placed on the stationary or movable (sprung) part.

In a further preferred embodiment both the sonotrode and also the anvil are fixed to a base bracket, wherein preferably the anvil can best be moved towards or away from the sonotrode by way of a linear guide. That makes it possible to provide an ultrasound welding module which can be flexibly used and which can be employed in the most widely differing machines. The fact that the anvil can be moved relative to the sonotrode ensures accessibility to the module in adjustment or maintenance operations and the film web can be easily introduced between the sonotrode and the anvil. In addition the linear guide can be used to coarsely adjust the working point (gap size). Exact setting of the working point is then effected by way of the counterforce generator.

Equally that separate linear guide can be used alone or in combination with the counterforce generator to compensate for defined multi-ply configurations of the material web. It is advantageous in that respect that the multi-ply configuration is compensated by the complete welding module and the non-welded flaws are reduced to a minimum.

For example the anvil can have an anvil substructure and a working portion which is connected thereto by way of a joint and on which the anvil welding surface is arranged, wherein the joint is preferably a solid-state joint.

The advantage of such an ultrasound welding device is that the anvil can be of a very small mass by virtue of its simple structure and its manner of mounting with a spring joint. In that way the resonance frequency can be increased, in spite of the low levels of spring stiffness, and that permits a rapid reaction to changes in the material thickness and the properties of the webs to be welded. It will be appreciated that the resonance frequency should be markedly below the oscillation frequency of the sonotrode. In addition a spring joint provides a play-free guide which permits a highly accurate seam. In addition that helps with keeping the process parameters constant. A further advantage of a spring joint is that it operates in friction-free fashion and as a result no hysteresis effects or stick-slip effects occur. In a further embodiment the spring joint is in the form of a solid-state joint.

In that way the anvil can be produced in one piece by wire erosion, and that drastically reduces the production expenditure in comparison with other solutions. In addition solid-state joints have better properties than spring joints which are made from a plurality of pieces, for example with a piece of spring plate as the spring element. That is accounted for in particular by the homogeneity of the material and friction in the connecting locations. The continuous spring movement provides that screwed parts can move relative to each other and require additional securing measures to ensure continuous accuracy in guidance.

Alternatively the movable anvil structure can be arranged on a very accurately guided linear unit. What is important in that respect is a long guide unit which is as accurate as possible and which permits very few frictional losses and thus few undefined force states. That guide unit can equally be provided with a counterforce generator. In addition the respective welding force can be ascertained by an additionally adaptable force detecting device. That is implemented in series, that is to say in the direct flow of force in relation to the welding force applied.

In a further aspect of the invention there is proposed a method of ultrasound welding, in which an ultrasound welding device with one or more of the above-described features is used.

In a particularly preferred embodiment the abutment element is so adjusted that the minimum spacing between the anvil welding surface and the sonotrode welding surface is less than the thickness of the films to be welded, preferably between 0.25 and 0.75 of the thickness of the films to be welded, and best between 0.4 and 0.6 of the thickness of the films to be welded. In that case the expression thickness of the film to be welded is used to mean the overall thickness of the material webs to be welded. If for example a film of a thickness of 0.3 mm is welded in a two-ply relationship the thickness of the films to be welded is 0.6 mm.

In addition a preferred embodiment provides that the counterforce generator is so adjusted that the anvil applies a preset welding force to the abutment element.

To minimise the change in the welding gap due to heating of the sonotrode it can be provided that a greater ultrasound power is used for the welding operation during a first welding period than in a second welding period which is after the first welding period.

That measure provides that more energy is introduced into the system during the first welding period. During that welding period therefore rapid heating of the tool occurs. The first welding period is of such a length that the tool temperature is increased to the desired working temperature.

The temperature of the welding tools influences ultrasound welding. Heat energy is introduced into the material web to be processed by contact between the sonotrode and/or the counterpart tool with the material web. The hotter the sonotrode and/or the counterpart tool, the correspondingly less ultrasound energy is required for the welding operation.

In addition the temperature of the sonotrode welding surface can be detected and preferably the ultrasound power can be selected in dependence on the temperature of the sonotrode welding surface.

Alternatively or in combination with adjustment of the ultrasound power the temperature of the sonotrode can be regulated to a working temperature.

For example the sonotrode and/or the anvil can be heated prior to the welding operation. Heating at the beginning of production avoids the first welded seams being defective because the correct process temperature has not yet been reached. That pre-heating temperature advantageously corresponds to the temperature which is optimum during the welding process.

In a further embodiment the temperature of the sonotrode and/or optionally present intermediate parts between the sonotrode and the ultrasound generating unit and/or the anvil is kept substantially constant by changes in the process parameters of the ultrasound oscillator such as for example amplitude and/or force or by the temperature of temperature-control media, whereby effects of variations in the welding speed, ambient temperature, material irregularities or other parameters which influence temperature are reduced.

The specified measures mean that the temperature at the welding location can be influenced. By feedback of suitable process parameters such as for example a temperature signal from the welding location, the power output of the ultrasound generating unit or the welding speed, the specified effects can be incorporated into a regulating circuit, as actuating members. In that way the temperature can be kept constant by way of a simple or also a complex regulating circuit, whereby variations in welding speed, ambient temperature, material irregularities or other parameters which influence temperature are regulated out.

In a further embodiment the abutment element is fixed to the working element and is at substantially the same spacing from the spring joint as the anvil welding surface.

In that way the lever arm for the abutment element and for the anvil welding surface is the same so that an adjustment distance causes the same change in the size of the process gap. Thus for example a micrometer screw can represent the abutment element and the scale thereof can be used as a measurement for gap adjustment. That simplifies handling of the abutment element.

In a further embodiment the counterforce can be measured by the counterforce generator.

As that prestressing substantially corresponds to the welding force, the welding force can be ascertained by such a measurement. That can be useful for process monitoring purposes, for example the welding force can be regulated to a target value. Measurement can be effected for example by a force measuring cell, by way of which the flow of force is passed to the anvil. In the case of a hydraulic or pneumatic counterforce generator, alternatively the pressure which generates the counterforce can be measured.

In a further embodiment the measured counterforce serves as a reference parameter for different film structures when setting up the system.

For welding different material webs, a different welding force may be required. To be able to quickly set that force, it is desirable to retain suitable setting values. They can have been previously obtained by measurement of the prestressing.

In a further embodiment the mobility of the anvil and therewith also the spring joint is limited transversely relative to its main spring direction by one or more side abutments.

In that way the spring joint is protected from forces which could possibly destroy it transversely relative to its main spring direction.

In a further embodiment the anvil substructure is mounted movably with a linear guide relative to the element to which it is fixed.

In a further embodiment a temperature control fluid flows through the anvil to provide for temperature control thereof.

That can serve to keep the temperature constant during the welding process, or to pre-heat the anvil before starting production.

In a further embodiment a temperature control system is arranged in the immediate proximity of the welding location of the anvil and/or a sonotrode.

The temperature control system can be for example an electrical heating means. It can serve to keep the process temperature constant and/or to pre-heat the sonotrode and/or anvil before starting up production.

In a further embodiment the temperature of the welding location of the anvil and/or the temperature of the sonotrode welding surface is detected.

Those temperatures represent a measurement in respect of the welding temperature. The temperatures can be kept constant for example by a regulating circuit.

In a further embodiment the anvil and/or the sonotrode have air at a constant temperature blown thereagainst, for temperature control purposes.

That can serve to keep the process temperature constant and/or to pre-heat the anvil and/or the sonotrode before starting up production.

In a further embodiment the temperature of the air is regulated so that thermal changes at the welding location are regulated out.

In a further embodiment the sonotrode is made substantially from titanium, aluminum or steel.

With such a sonotrode heat which is produced in the welding process can be quickly dissipated from the welding location. That serves for faster reaction of the system to thermal changes at the welding location.

In a further particularly preferred embodiment the ultrasound oscillating unit is fixed directly to the sonotrode. That reduces the change in the gap width, caused by changes in the length of the sonotrode because of temperature fluctuations.

Figure 2:
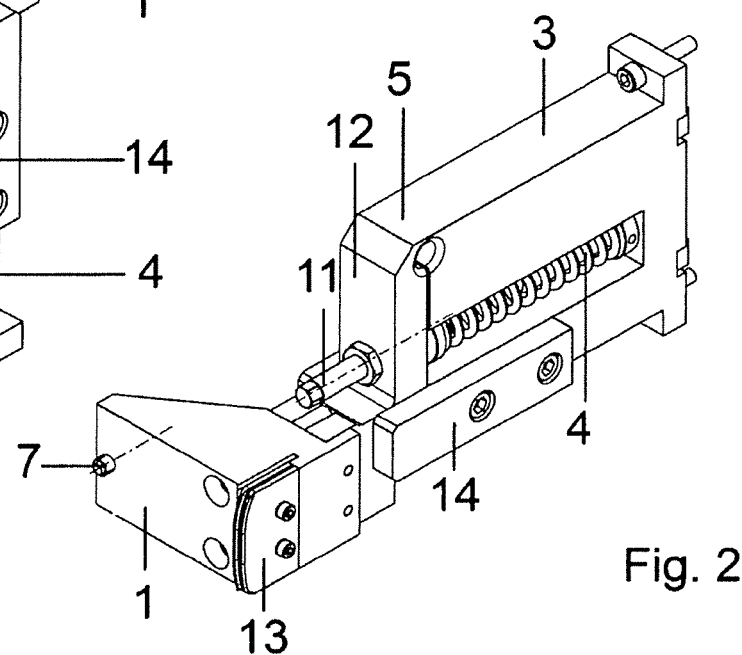
Figure 3:
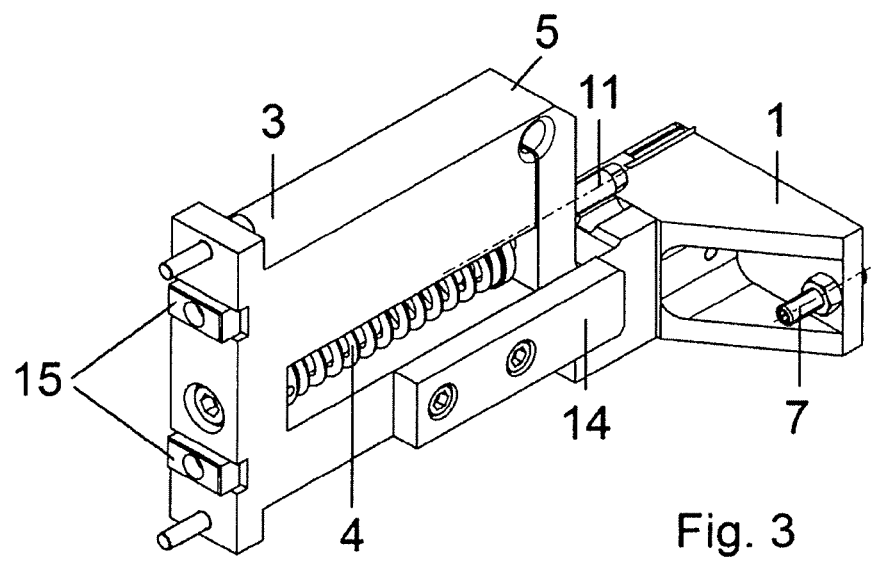
Figure 4:
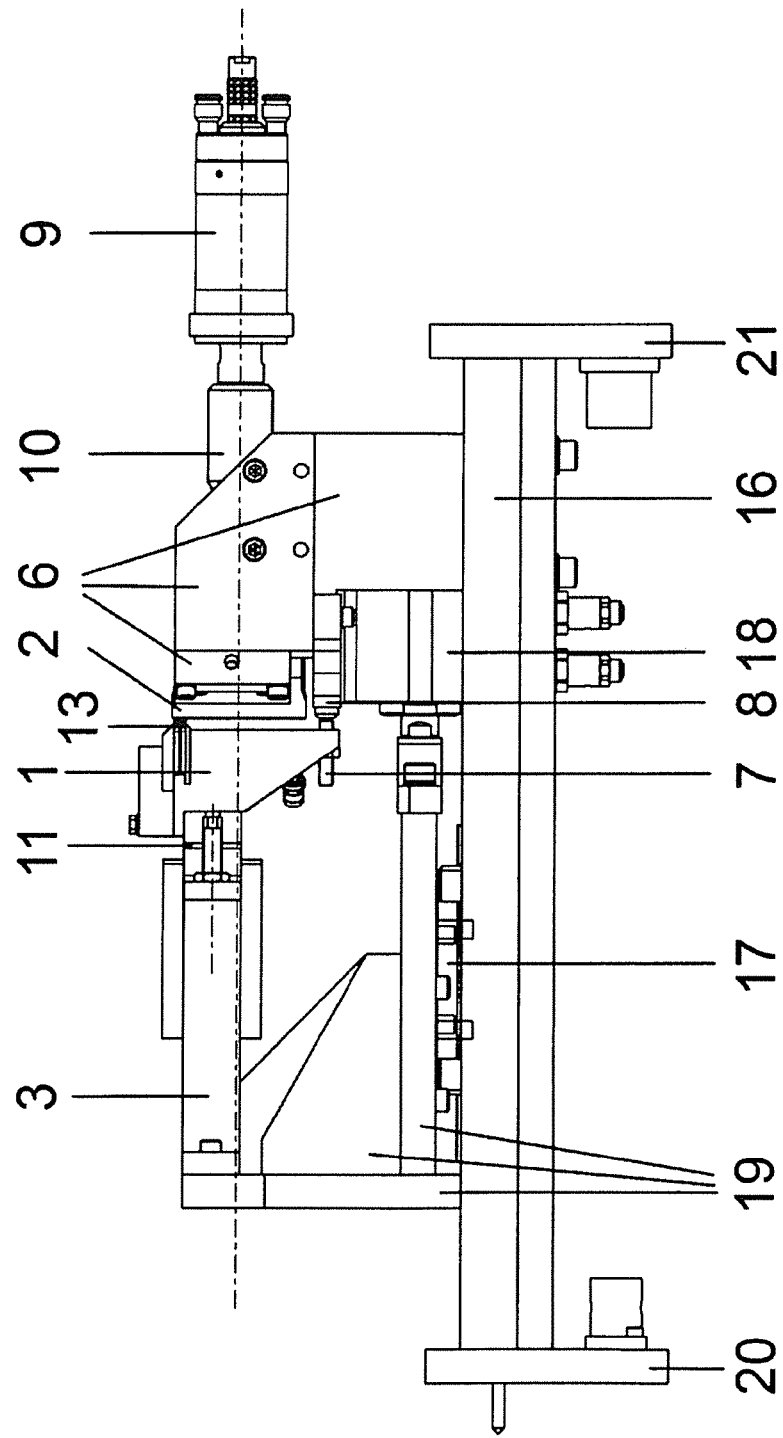
Figure 5:
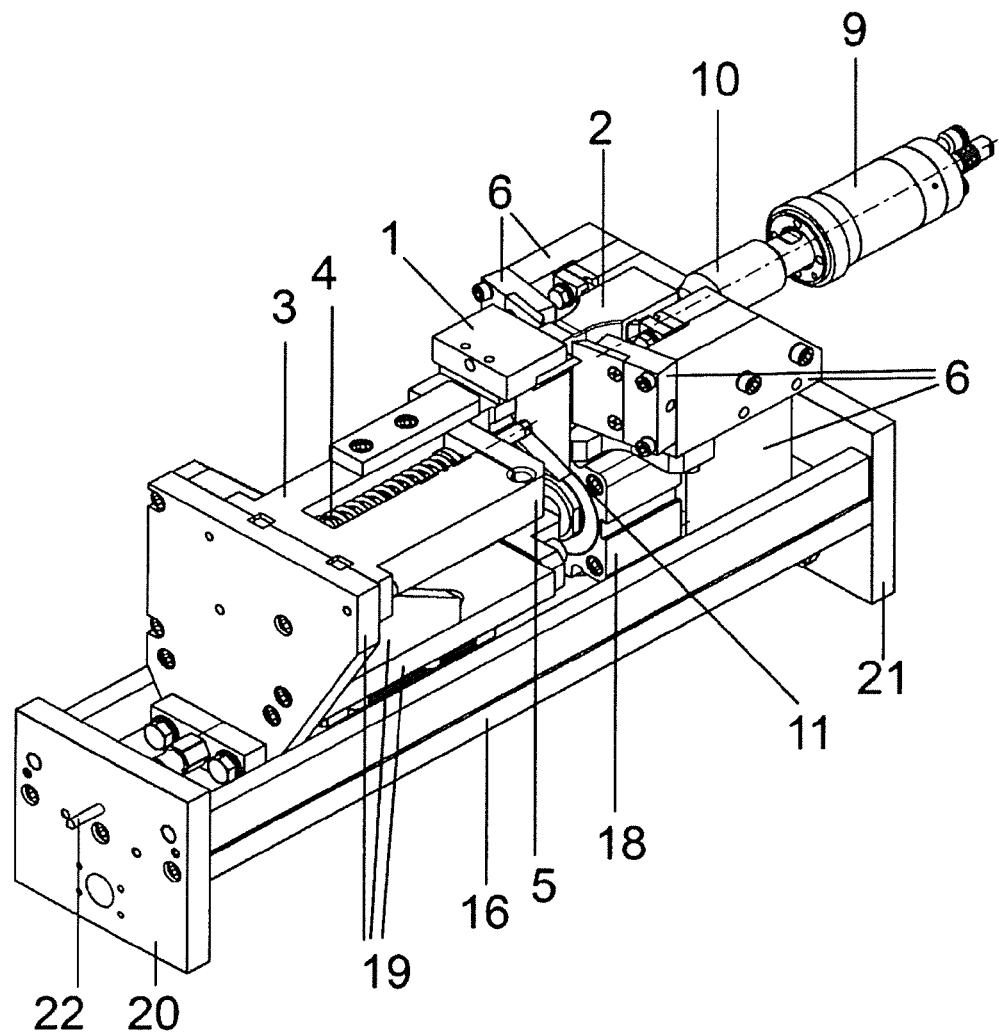
Figure 6:
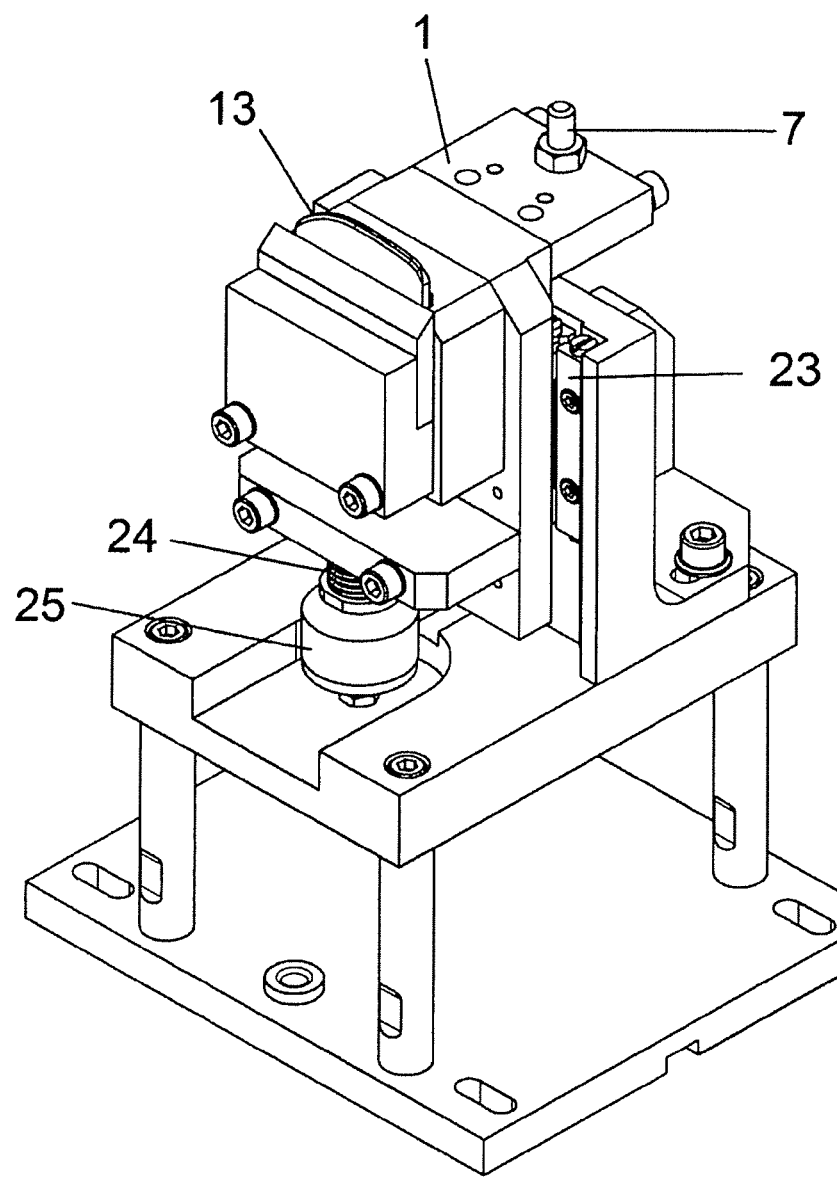
Figure 7:
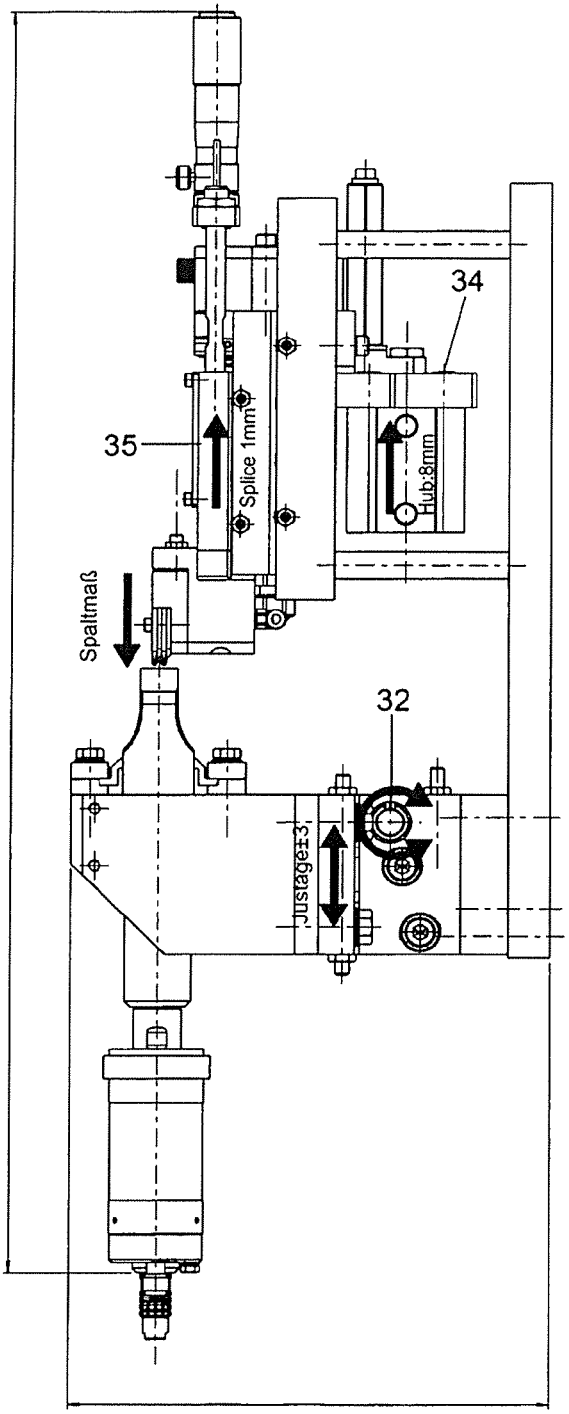
Figure 8:
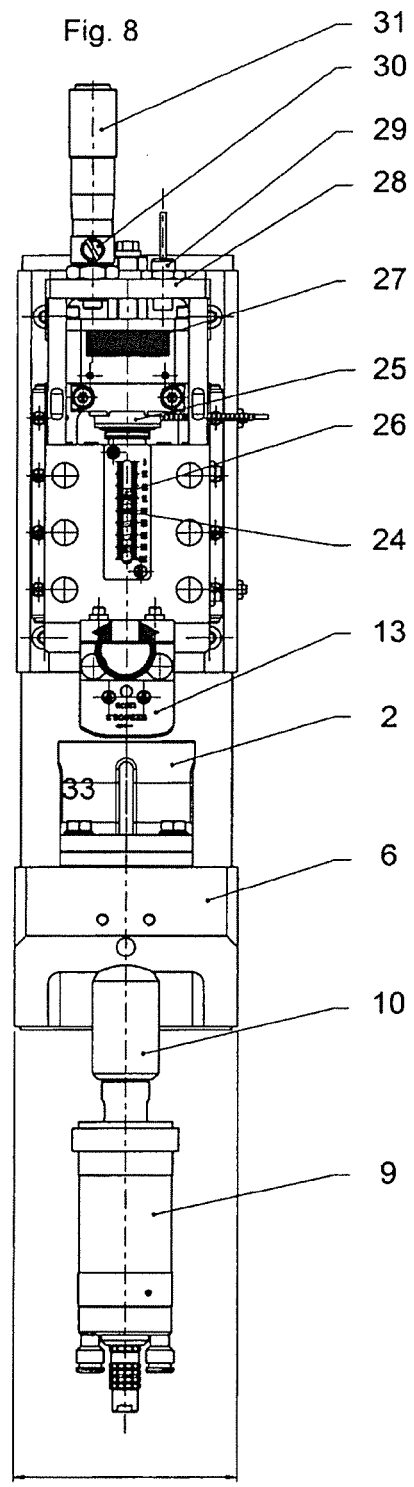

Further advantages, features and possible uses of the invention will be apparent both from the following description of preferred embodiments and also from the accompanying Figures in which:

FIG. 1 shows a perspective view of the anvil and the anvil substructure,

FIG. 2 shows a further perspective view of the anvil and the anvil substructure, FIG. 3 shows a further perspective view of the anvil and the anvil substructure, FIG. 4 shows a side view of the ultrasound welding device in the assembled condition, FIG. 5 shows a perspective view of the ultrasound welding device in the assembled condition, FIG. 6 shows a perspective view of the second embodiment of an anvil and the anvil substructure, FIG. 7 shows a side view of a third embodiment of the invention, and FIG. 8 shows a view from above of the third embodiment of the invention as shown in FIG. 7.

FIG. 1 shows the anvil 1 and the anvil substructure 2 with its attachments. The anvil substructure 3 goes in one piece by way of the spring joint 5 into the working portion 12 which is of a bar-shaped configuration and on which the anvil welding surface is arranged. The anvil welding surface here comprises an anvil blade 13. In addition provided on the bar-shaped portion 12 is an adjusting screw 11 for adjusting the spring prestressing of the spring element 4. In addition, provided in the anvil 1 is an adjustable part of the abutment 7 which co-operates with a second part of the abutment 8 which is not shown in FIG. 1. Provided laterally beside the anvil 1 is one of two side abutments 14 which is fixed to the anvil substructure 3. It limits the movement options of the anvil in the direction of the side abutment 14 so that the spring joint 5 is implemented by adjusting forces at the adjusting screw 11 or by side forces which can occur due to faults in the welding process. The substructure 3 has an opening in which a spring element 4 is fitted. It produces a prestressing between the bar-shaped working portion 12 of the anvil 1 and the anvil substructure 3. The spring element 4 forms the counterpressure device 4, 5 which by its spring action counteracts the forces of the sonotrode 2.

FIG. 2 shows substantially the same elements of the anvil as FIG. 1. Due to the different perspective however it is possible to see the other side abutment 14.

FIG. 3 also shows the anvil substructure 3 and the anvil 1 with attachments. This perspective view also shows the lock nut of the abutment portion 7 and two fitting keys 15 arranged parallel to each other at the end face of the anvil substructure 3. They serve for oriented mounting of the ultrasound welding device in a larger unit, for example a tubular bag packaging machine or a linearly arranged adjusting unit.

FIG. 4 shows a side view of the ultrasound welding device. The anvil substructure 3 is shown here in its installation position in which it appears only as a flat rectangle. It is adjoined by the anvil 1 with the anvil blade 13. Arranged opposite the anvil blade 13 is the sonotrode 2, wherein welding of material webs takes place in the very small intermediate space which is not visible in the drawing. The sonotrode 2 is fixed in a sonotrode holder 6 which in turn is secured to a base plate 16. Fixed to the sonotrode holder 6 is the second part of the abutment 8 which is in contact with the adjustable part of the abutment 7 which is fixed in the anvil 1. The position set at the adjustable part 7 directly influences the spacing between the anvil blade 13 and the sonotrode 2. The sonotrode 2 is connected to a booster 10, the connecting location of the sonotrode holder 6 being concealed in the Figure. The booster 10 is in turn connected to the converter 9. Fixed to the base plate 16 is a linear guide 17 with which the anvil 1, the anvil substructure 3 and an anvil carriage 19 can be displaced. The anvil carriage 19 is connected to a pneumatic cylinder 18 which makes it possible to move the anvil blade 13 away from the sonotrode 2. The welding gap is opened wide in that way. The pneumatic cylinder 18 is preferably a double-acting pneumatic cylinder. Mounted at the ends of the base plate 16 are terminal plates 20 and 21 which serve for fixing the ultrasound welding device for example in a machine.

FIG. 5 shows a perspective view of the ultrasound welding device. Substantially the same components as in FIG. 4 are to be seen here. The sonotrode holder 6 however can be seen in greater detail. Provided in the end plate 20 is a centering pin 22 which facilitates accurate positioning of the ultrasound welding device upon being fitted in a machine.

In addition there can be provided a further abutment for coarse positioning of the anvil. That further abutment can be embodied in the linear unit.

FIG. 6 shows an alternative embodiment. In contrast to the previous embodiment here the anvil is not held by means of a solid-state joint but by way of a linear unit 23. The spring element 24 ensures passive mobility of the anvil 13. To measure the force, there is a force measuring cell 25 which can be dispensed with in many cases.

FIGS. 7 and 8 show a side view and a view from above of a third embodiment of the invention.

The sonotrode 2 is held by way of the sonotrode holder 6 and is connected to the converter 9 by way of the amplitude transformer 10. The entire sonotrode holder 6 can be moved for adjustment on the one hand linearly in the direction of the counterpart tool 13 and on the other hand can be pivoted about the pivot axis 32 shown in FIG. 7. The counterpart tool 13 which can be pivoted about the pivot axis 33 can be prestressed by means of the spring 24 into a predetermined position, as indicated in FIG. 8. Spring prestressing is afforded by means of the spindle nut 26 which can be linearly moved by rotation of the hand wheel 27. The force applied to the material web can be measured by means of the force measuring cell 25.

The counterpart tool 13 can be moved towards or away from the sonotrode 2 by means of a linear drive. In the illustrated embodiment the linear drive comprises a coarse drive 34 and a fine drive 35. The fine drive 35 can be adjusted by means of the micrometer screw 31 and fixed by means of the clamping screw 30. The spacing sensor 29 serves to detect the position of the counterpart tool 13.

LIST OF REFERENCES 1 anvil
2 sonotrode
3 anvil substructure
4 spring element
5 spring joint
4, 5 counterpressure device
6 sonotrode holder
7 abutment
8 abutment
9 converter
10 booster, amplitude transformer
11 adjusting screw
12 bar-shaped working portion
13 anvil blade
14 side abutment
15 fitting keys
16 base plate
17 linear guide element
18 pneumatic cylinder
19 anvil carriage
20, 21 terminal blades
22 centering pin 23 linear unit
24 spring element
25 force measuring cell
26 spindle nut
27 hand wheel
29 spacing sensor
20 clamping screw
31 micrometer screw
32, 33 pivot axis
34 coarse drive
35 fine drive

The invention claimed is:

1. An ultrasound welding device for welding material webs such as for example films having an anvil (1) with an anvil welding surface and a sonotrode (2) having a sonotrode welding surface, wherein the anvil is movable relative to the sonotrode and there is provided a counterforce generator which exerts a counterforce on the anvil in the direction of the sonotrode if the anvil is moved out of a reference position away from the sonotrode, characterised in that there is provided an abutment element which is so arranged that it limits the movement of the anvil in the direction of the sonotrode so that the anvil welding surface maintains a target minimum spacing relative to the sonotrode welding surface, that is fixed by the abutment element.

2. An ultrasound welding device as set forth in claim 1 characterised in that the counterforce generator (4) has a spring element (4).

3. An ultrasound welding device as set forth in claim 1 or claim 2 characterised in that the counterforce of the counterforce generator (4, 5) is adjustable.

4. An ultrasound welding device as set forth in claim 1 characterised in that the counterforce generator (4, 5) is so adjusted that the anvil exerts a force on the abutment element (7, 8) when the anvil is at the minimum spacing relative to the sonotrode (2).

5. An ultrasound welding device as set forth in one of claims 1 through 2 characterised in that both the sonotrode and also the anvil are fixed to a base bracket, wherein preferably the anvil can best be moved towards or away from the sonotrode by way of a linear guide.

6. An ultrasound welding device as set forth in one of claims 1 through 2 characterised in that the anvil has an anvil substructure and a working portion which is connected thereto by way of a joint and on which the anvil welding surface is arranged, wherein the joint is preferably a solid-state joint.

7. An ultrasound welding device as set forth in one of claims 1 through 2 characterised in that the anvil is arranged on a movable linear unit.

8. A method of ultrasound welding characterised in that an ultrasound welding devices as set forth in one of the preceding claims 1-2 is used.

9. An ultrasound welding method as set forth in claim 8 characterised in that the abutment element is so adjusted that the minimum spacing between the anvil welding surface and the sonotrode welding surface is less than the thickness of the films to be welded, preferably between 0.25 and 0.75 of the thickness of the films to be welded, and best between 0.4 and 0.6 of the thickness of the films to be welded.

10. A method as set forth in claim 8 characterised in that the counterforce generator is so adjusted that the anvil applies a preset welding force to the abutment element.

11. A method as set forth claim 8 characterised in that a greater ultrasound power is used for the welding operation during a first welding period than in a second welding period which is after the first welding period.

12. A method as set forth claim 8 characterised in that the temperature of the sonotrode welding surface is detected and preferably the ultrasound power is selected in dependence on the temperature of the sonotrode welding surface.

13. A method as set forth in claim 12 characterised in that the temperature of the sonotrode and/or the anvil is regulated to a working temperature.

14. A method as set forth claim 8 characterised in that the counterforce of the anvil is detected and regulated to a predetermined value.

15. An ultrasound welding device as set forth in claim 1 characterised in that the target minimum spacing is adjustable.

* * * * *